United States Patent
Alatorre et al.

(10) Patent No.: US 9,513,835 B2
(45) Date of Patent: Dec. 6, 2016

(54) IMPACT-BASED MIGRATION SCHEDULING FROM A FIRST TIER AT A SOURCE TO A SECOND TIER AT A DESTINATION

(71) Applicant: International Business Machines Corporation, Armonk, NY (US)

(72) Inventors: Gabriel Alatorre, Long Beach, CA (US); James E. Olson, Seymour, CT (US); Ramani R. Routray, San Jose, CA (US); Yang Song, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 99 days.

(21) Appl. No.: 14/593,094

(22) Filed: Jan. 9, 2015

(65) Prior Publication Data

US 2016/0202933 A1    Jul. 14, 2016

(51) Int. Cl.
*G06F 13/00* (2006.01)
*G06F 3/06* (2006.01)
*G06F 11/20* (2006.01)

(52) U.S. Cl.
CPC ........... *G06F 3/0647* (2013.01); *G06F 3/0604* (2013.01); *G06F 3/0683* (2013.01); *G06F 11/203* (2013.01)

(58) Field of Classification Search
CPC .... G06F 3/0647; G06F 3/0604; G06F 3/0683; G06F 3/067; G06F 3/061; G06F 17/30221; G06F 11/203; H04L 67/1097
USPC ................... 711/112, 165; 718/102; 707/809
See application file for complete search history.

(56) References Cited

U.S. PATENT DOCUMENTS

| | | | |
|---|---|---|---|
| 6,600,721 B2 | 7/2003 | Edholm | |
| 7,716,441 B2 * | 5/2010 | Kano | G06F 3/0605 707/809 |
| 8,185,712 B2 * | 5/2012 | Sarkar | G06F 3/0605 711/167 |
| 8,191,063 B2 | 5/2012 | Shingai et al. | |
| 8,365,009 B2 | 1/2013 | Dournoy et al. | |

(Continued)

OTHER PUBLICATIONS

Breitgand, D., et al., "Cost-Aware Live Migration of Services in the Cloud," Systor, 2010—usenix.org; pp. 1-6.
Chen, H. et al., "Network-Aware Coodination of Virtual Machine Migrations in Enterprise Data Centers and Clouds," Integrated Network Management (IM 2013), 2013 IFIP/IEEE; pp. 888-891.

(Continued)

*Primary Examiner* — Hong Kim
(74) *Attorney, Agent, or Firm* — Cantor Colburn LLP; Bryan Butler (57) ABSTRACT

Embodiments relate to impact-based migration scheduling. An aspect includes identifying, by a migration scheduling module, a plurality of feasible destination storage devices for a migration session. Another aspect includes determining, for each of the identified destination storage devices, an impact of the migration session during the migration session. Another aspect includes determining, for each of the identified destination storage devices, an impact of the migration session after the migration session is completed. Another aspect includes selecting a destination storage device from the identified destination storage devices based on the impact of the migration session during the migration session and the impact of the migration session after the migration session is completed. Another aspect includes determining a start time and transfer rate for the migration session based on the selected destination storage device.

20 Claims, 5 Drawing Sheets

(56) References Cited

U.S. PATENT DOCUMENTS

| | | | | |
|---|---|---|---|---|
| 8,578,108 B2* | 11/2013 | Jennas, II | ............. | G06F 3/0613 707/639 |
| 8,762,995 B2* | 6/2014 | Akaike | ................... | G06F 3/061 711/117 |
| 2010/0011368 A1* | 1/2010 | Arakawa | ............... | G06F 3/0604 718/104 |
| 2011/0202732 A1* | 8/2011 | Montgomery | .......... | G06F 3/061 711/154 |
| 2012/0101973 A1* | 4/2012 | Ito | ..................... | G06F 17/30221 706/50 |
| 2013/0311740 A1* | 11/2013 | Watanabe | ............... | G06F 3/061 711/165 |
| 2014/0026133 A1 | 1/2014 | Parker | | |

OTHER PUBLICATIONS

Stage, A. et al., "Network-Aware Migration Control and Scheduling of Differentiated Virtual Machine Workloads," CLOUD '09, May 23, 2009, Vancouver, Canada; ICSE '09 Workshop; pp. 9-14.

Wu, Y., et al., "Performance Modeling of Virtual Machines Live Migration," Cloud Computing (CLOUD), 2011 IEEE International Conference on IEEE, 2011; pp. 1-8.

Zhang, Z., et al., "A Scheduling Method for Multiple Virtual Machines Migration in Cloud," C-H., Hsu et al. (Eds.): NPC 2013, LNCS 8147; pp. 130-142; IFIP International Federation for Information Processing 2013.

Zheng, J., et al., "Pacer: A Progress Management System for Live Virtual Machine Migration in Cloud Computing," IEEE Transcations on Network and Service Management, vol. 10, No. 4, Dec. 2013; pp. 369-382.

* cited by examiner

IMPACT-BASED MIGRATION SCHEDULING FROM A FIRST TIER AT A SOURCE TO A SECOND TIER AT A DESTINATION

BACKGROUND

The present invention relates generally to computer storage systems, and more specifically, to impact-based migration scheduling in a computer storage system.

In a computer storage system (for example, a data center), volumes of data are stored across a plurality of physical computer storage devices. Periodically, storage migration, i.e., moving data from one physical storage device (or set of devices) to another physical storage device (or set of devices), may be necessary to lower costs and/or increase performance. For example, in a computer storage system that includes various tiers of physical storage devices, each data volume may be evaluated periodically to compare the tier of its current physical storage location with the data volume's input/output (I/O) characteristics. If the tier of the current physical device is a poor match for the data volume, migration to a different physical device in another tier may be recommended for the data volume. For example, if a data volume is accessed frequently but the underlying storage device is a lower tier device with moderate (not high) performance, an uptiering migration may be recommended to move the data volume to a higher tier device with better performance.

SUMMARY

Embodiments include a method, system, and computer program product for impact-based migration scheduling. An aspect includes identifying, by a migration scheduling module, a plurality of feasible destination storage devices for a migration session, the migration session comprising a transfer of a data volume from a source storage device located in a first tier to a destination storage device located in a second tier in a computer storage system. Another aspect includes determining, for each of the identified destination storage devices, an impact of the migration session during the migration session. Another aspect includes determining, for each of the identified destination storage devices, an impact of the migration session after the migration session is completed. Another aspect includes selecting a destination storage device from the identified destination storage devices based on the impact of the migration session during the migration session and the impact of the migration session after the migration session is completed. Another aspect includes determining a start time and transfer rate for the migration session based on the selected destination storage device.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Embodiments of impact-based migration scheduling are provided, with exemplary embodiments being discussed in detail. A tiering report may include a list of migration sessions that are recommended to improve the distribution of the data volumes across heterogeneous computer storage devices in a computer storage system. The tiering report may specify, for each migration session, a destination tier and a migration time window, which is a time interval during which the migration session can be run. Impact-based migration scheduling is applied to determine a specific destination storage device within the recommended tier, a start time within the migration time window, and a transfer rate for the migration sessions recommended in the tiering report. The impact of a migration session both during and after the migration session are determined and used to select the specific destination storage device, start time within the migration time window, and transfer rate.

Impact-based migration scheduling may avoid failure of migration session, which may occur in an approach that selects the currently least utilized device as the destination device in a target tier and starting the migration sessions in the tiering report in an unstructured order. High traffic load during a migration session may cause the migration session to take an unexpectedly long time and eventually fail. In addition, excessive load from migration sessions may cause intolerable performance degradation of regular storage workload, e.g., user generated I/O workload from applications. Failed migration sessions result in wasted bandwidth and computation resources. For example, a migration of a 1 terabyte (TB) volume at a transfer rate of 60 megabytes per second (MBps) will take more than 4 hours. The background I/O load on both the source and destination storage devices may vary during the 4 hour time duration. Selection of an appropriate target device, start time, and transfer rate may help avoid background traffic peaks that can cause unacceptable device response times resulting in aborting of a migration session, as well as the negative impact on regular IO loads.

Table 1 below illustrates an example tiering report for a data center. As shown in Table 1, data volume 1 needs to be moved from V7k1, which is a tier 2 device, to a tier 1 device within the time window 3 am-5 am, and data volume 2 needs to be moved from V7k2, which is a tier 3 device, to a tier 1 device within the time window 2 am-4 am. Table 1 is shown for illustrative purposes only; a tiering report may include any appropriate number of recommended migration sessions.

TABLE 1

Example Tiering Report

| VOLUME | DEVICE NAME | FROM TIER | TO TIER | WINDOW |
|---|---|---|---|---|
| Vol. 1 | V7k1 | 2 | 1 | 3 am-5 am |
| Vol. 3 | V7k2 | 3 | 1 | 2 am-4 am |

Figure 1:
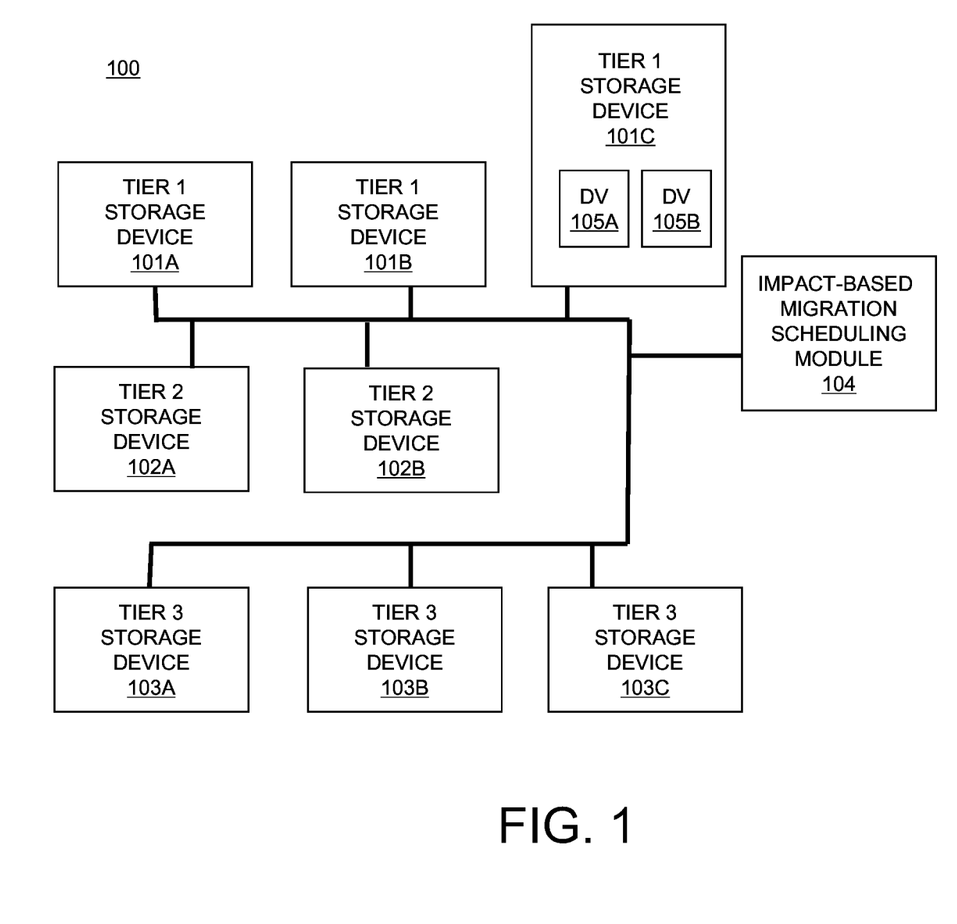
FIG. 1 depicts a computer storage system comprising a plurality of tiers and an impact-based migration scheduling module in accordance with an embodiment.

In a computer storage system that comprises a data center, there are multiple storage devices belonging to the same tier. FIG. 1 illustrates an embodiment of a computer storage system 100. The computer storage system 100 includes a plurality of tiers (e.g., as shown in FIG. 1, tiers 1, 2, and 3), each tier including a plurality of storage devices comprising computer memory. Tier 1 comprises tier 1 storage devices 101A-C; Tier 2 comprises tier 2 storage device 102A-B; and tier 3 comprises tier 3 storage devices 103A-C. Tier 1 storage devices 101A-C each have higher I/O capability than each of tier 2 storage devices 102A-B, and tier 2 storage devices each have higher I/O capability than each of tier 3 storage devices 103A-C. The storage devices 101A-C, 102A-B, and 103A-C in the various tiers may comprise different types of memory (for example, a higher tier device may comprise a relatively fast type of memory such as solid state memory, while a lower tier device may comprise a relatively slow type of memory such as a magnetic or optical disk), and the storage devices may also be of different sizes across or within tiers. Each of storage devices 101A-C, 102A-B, and 103A-B may store any appropriate number of volumes of data, such as data volumes 105A-B shown in storage device 103C. Each data volume may be of any appropriate size. A migration scheduling module 104 oversees migration of volumes of data between storage devices 101A-C, 102A-B, and 103 A-C in the computer storage system 100. FIG. 1 is shown for illustrative purposes only; a computer storage system may comprise any appropriate number of tiers; each tier may comprise any appropriate number of storage devices, and the storage devices in the computer storage system may be connected in any appropriate manner. Further, a storage device may hold any appropriate number of volumes of data, based on the size of the memory in the storage device and the sizes of the volumes of data.

A migration session involves a relatively large data transfer during a non-negligible time duration (e.g., migrating a 20 gigabyte (GB) storage volume to a device with a transfer rate of 10 MBps) that will significantly increase load and deteriorate the overall performance of both the source and destination devices during the migration. In order to perform an uptiering migration of a data volume from a storage device in a lower tier (i.e., tier 2 or tier 3) to a storage device in tier 1, migration scheduling module 104 must select one of tier 1 storage devices 101A-C as a destination storage device. Any of storage devices 101A-C that has sufficient free resources to hold the data volume being migrated may be identified as a feasible destination storage device. Migration scheduling module 104 may determine the impact of the migration session both during and after the migration on each of the feasible destination storage devices in order to select one of the devices as the destination device.

Figure 2:
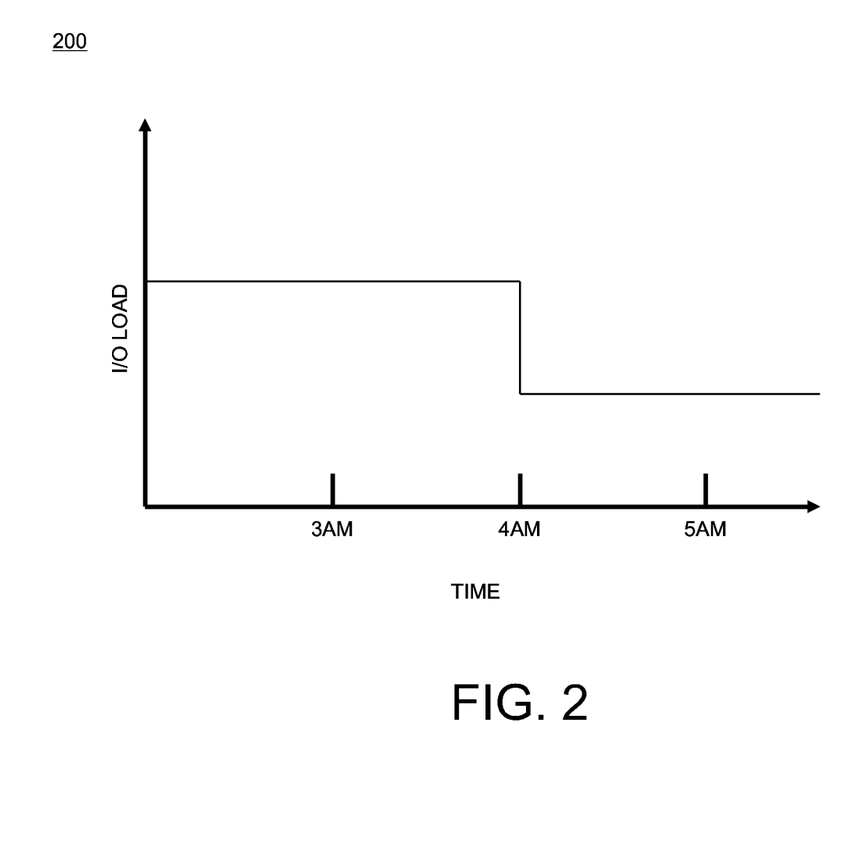
FIG. 2 depicts an example of historical input/output load over time for a storage device in accordance with an embodiment.

During the migration time window recommended by the tiering report for a migration session, the I/O loads of the feasible destination devices may vary over time, based on the data volumes that are current stored on each of the feasible destination devices. Therefore, the start time of the migration within the recommended time window may have a significant impact on the destination device load during the migration session. FIG. 2 illustrates an example of historical I/O load over time (or background workload) for a storage device. As shown in FIG. 2, if a migration session involving the storage device starts at 3 am, the peak I/O load of the storage device may be determined to be higher than if the migration session is postponed until after 4 am; however, this determination may vary based on the size of the data volume and the transfer rate. Therefore, a start time and transfer rate that minimize the peak I/O load, while allowing the migration session to complete during the migration window, may be determined in order to determine the impact of the migration session during the migration session. In various embodiments, peak I/O load or average I/O load may be used to determine impact during the migration session. Historical I/O load data may be collected and maintained for each storage device 101A-C, 102A-B, and 103A-C in the computer storage system 100 by, for example, migration scheduling module 104.

The impact after the migration session may be determined based on average workload characteristics of a destination device, such as I/O operations per second (IOPS), read/write ratio, and/or sequential/random ratio. For example, average device utilization may be used as a cost metric, in which case the migrated data volume's average I/O is added to the destination device's average I/O, and the sum is the impact after migration. The impact during migration and the impact after migration may then be considered together to select a destination device from the feasible destination devices using, for example, a weighted average or weighted sum.

Figure 3:
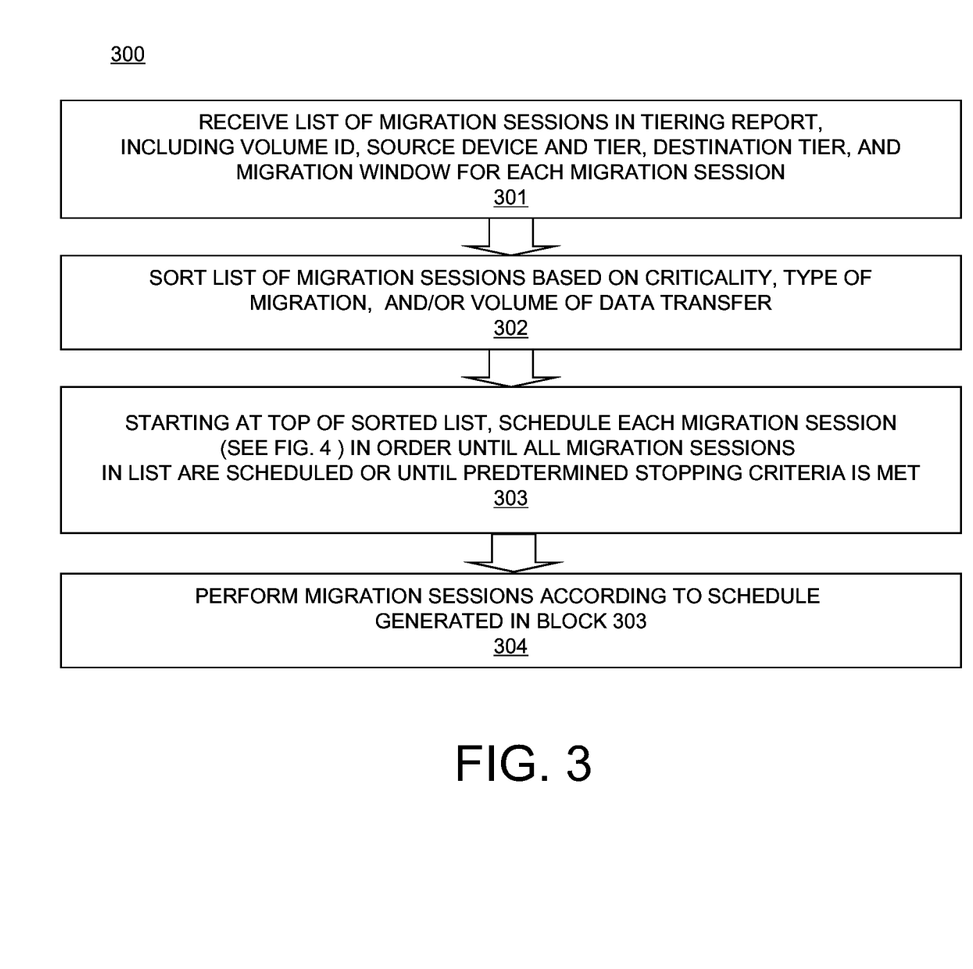
FIG. 3 depicts a process flow for impact-based migration scheduling in a computer storages system in accordance with an embodiment.

FIG. 3 illustrates an embodiment of a method 300 for impact-based migration scheduling. Method 300 may be implemented in migration scheduling module 104. First, in block 301, a tiering report comprising a list of recommended migration sessions is received. Each recommended migration session may include a volume identifier, a current storage device and tier, destination tier, and migration window. An example tiering report is shown in Table 1 above. Next, in block 302, the list of recommended migration sessions is sorted. Various metrics can be used to sort the migration sessions in the tiering report into a sorted list. The sorting may be performed based on any predetermined criteria such as criticality of the data in the volume (e.g., upper management's email may be considered highly critical), and the size of data volume being migrated. Any uptiering migrations may be placed above any downtiering migrations in the list in some embodiments. In some embodiments, migration sessions with an urgent deadline (i.e., a relatively short migration time window) may be placed above any migration sessions with relatively long migration time windows in the list. In further embodiments, migration sessions associated with line-of-business applications (e.g., a database) may be placed above sessions with less critical applications (e.g., file archival) in the list. Next, in block 303, starting at the top of the sorted list and working downwards, the migration sessions in the list are scheduled in turn as described below with respect to FIG. 4. For each recommended migration session, the current device, destination tier, and migration window information from the tiering report are used to determine a particular destination device within the destination tier, a start time within the migration window, and a data transfer rate. As scheduling proceeds down the list, migration sessions that were previously scheduled are taken into account when scheduling the current migration session. For example, when a migration session is scheduled for a destination device, the destination device's I/O load trajectory is updated to include the additional I/O load associated with the data volume of the scheduled migration session. The additional load takes into account the determined start time and the transfer rate of the scheduled migration session. All of the migration sessions in the list may be scheduled in some embodiments, or, in some embodiments, scheduling may be stopped before the bottom of the list is reached based on a migration threshold, e.g., a minimum average utilization, such as 90% utilization for the entire data center, being reached. Lastly, in block 304, the migration sessions are performed according to the schedule that was generated in block 303.

Figure 4:
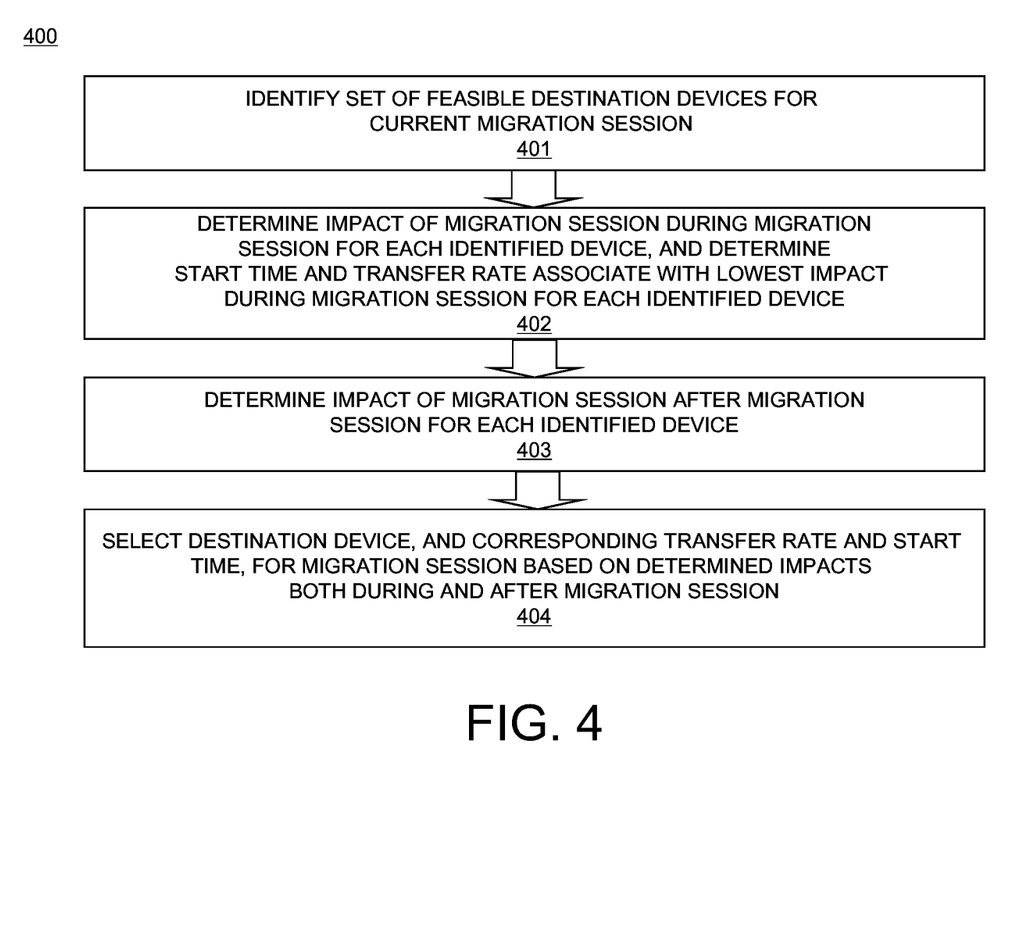
FIG. 4 depicts a process flow for scheduling a current migration session in accordance with an embodiment of impact-based migration scheduling.

FIG. 4 illustrates an embodiment of a method 400 for scheduling a current migration session. Method 400 is repeated in block 303 of FIG. 4 for each of a plurality of migration sessions in the sorted list, starting at the top of the sorted list and working downwards. First, in block 401, for the current migration session, one or more feasible destination devices are identified in the destination tier. The feasible destination device(s) must be in the designated destination tier, and also have sufficient free storage space for the data volume that is being transferred by the migration session. For example, for an uptiering migration session whose destination in tier 1, both of computer storage devices 101A-B may be identified in block 401 as having sufficient free space for the data volume being transferred by the current migration session. Any appropriate number of storage devices in the destination tier may be identified as feasible destination devices for the current migration session in block 401.

Next, in block 402, the impact of the migration session during the migration session for each of the destination devices that were identified in block 401 is determined. The impact during the migration session is determined based on the historical I/O load of each identified destination device. An example of historical I/O load over time for a storage device is shown in FIG. 2. In some embodiments, for each identified destination device, the suggested migration window is divided into K sub-intervals, each sub-interval corresponding to a respective start time within the migration window. For each migration session, the transfer rate is controllable; a higher transfer rate introduces higher load on the destination device during the migration session, but also reduces overall migration session transfer time. In order to determine the transfer rate for the migration session, a maximum transfer rate for the migration session is identified based on the I/O characteristics of both the source storage device and the destination storage device i.e., the maximum input rate (for a destination device) or output rate (for a source device) for the lowest-tier device involved in the migration session, to determine a feasible transfer rate range. The feasible transfer rate range is then given by [0, R], where R is the maximum transfer rate. The feasible transfer rate range may then be divided into L intervals. K and L may be predetermined values, or may be determined based on the size of the suggested migration window and the maximum transfer rate, respectively, in various embodiments.

For the current migration session, the volume size and the transfer rate are used to calculate the overall duration of the migration. Therefore, for each possible pair of migration start time (K possible start times, from beginning to end of the suggested migration window) and transfer rate (L possible rates, from 0 to R) that results in the current migration session completing during the migration window, the aggregate I/O load for the current migration session are determined for each identified destination device. For example, in some embodiments, a cost objective function which minimizes the peak value of I/O load for each of the identified destination devices during the current migration session may be used to determine impact. A lowest impact start time and transfer rate pair is thereby determined for each of the identified devices during the current migration session; the impact associated with this lowest impact start time and transfer rate pair is the determined impact during the current migration session for the destination device. Any appropriate cost objective function for impact during migration may be used; for example, the peak I/O load, or a time duration that the aggregate I/O load exceeds a predetermined load threshold, may be minimized in various embodiments.

Next, in block 403, the impact of the current migration session after the migration session has been completed is determined for each of the identified destination devices. The average historical I/O load of each of the identified destination devices is used to estimate the impact of the current migration session after the migration session. The impact after migration may be given, in some embodiments, by a sum of the average IOPS of the destination device and the average IOPS of the volume to be migrated by the current migration session.

Lastly, in block 404, after calculating the impact of the current migration session for each of the identified destination devices both during (block 402) and after (block 403) the current migration session, the current migration session is scheduled by considering both impacts together. Any appropriate method may be used to combine the two impacts into a single comparable metric to select the destination device having the lowest overall impact. After the destination device with the lowest overall impact is selected, the start time and transfer rate for the current migration session are determined to be the start time and transfer rate pair that yielded the lowest impact during the current migration session for the selected destination device, as discussed above with respect to block 402. In some embodiments, a weighed sum of the two impacts may be determined for each of the identified destination devices, and the identified destination device having the lowest weighted sum is selected as the destination device in block 404.

Figure 5:
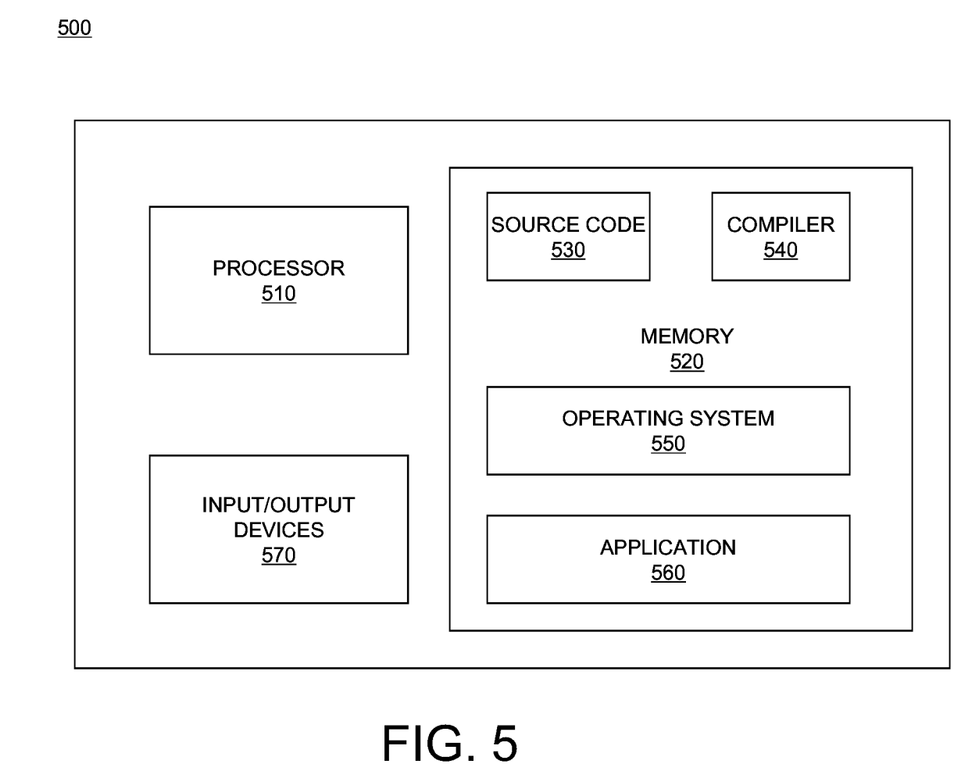
FIG. 5 depicts a computer system for use in conjunction with impact-based migration scheduling in accordance with an embodiment.

FIG. 5 illustrates an example of a computer 500 which may be utilized in conjunction with impact-based migration scheduling. Various operations discussed above may utilize the capabilities of the computer 500. One or more of the capabilities of the computer 500 may be incorporated in any element, module, application, and/or component discussed herein.

The computer 500 includes, but is not limited to, PCs, workstations, laptops, PDAs, palm devices, servers, storages, and the like. Generally, in terms of hardware architecture, the computer 500 may include one or more processors 510, memory 520, and one or more I/O devices 570 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a digital signal processor (DSP), or an auxiliary processor among several processors associated with the computer 500, and the processor 510 may be a semiconductor based microprocessor (in the form of a microchip) or a macroprocessor.

The memory 520 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 520 may incorporate electronic, magnetic, optical, and/or other types of storage media. Note that the memory 520 can have a distributed architecture, where various components are situated remote from one another, but can be accessed by the processor 510.

The software in the memory 520 may include one or more separate programs, each of which comprises an ordered listing of executable instructions for implementing logical functions. The software in the memory 520 includes a suitable operating system (O/S) 550, compiler 540, source code 530, and one or more applications 560 in accordance with exemplary embodiments. As illustrated, the application 560 comprises numerous functional components for implementing the features and operations of the exemplary embodiments. The application 560 of the computer 500 may represent various applications, computational units, logic, functional units, processes, operations, virtual entities, and/or modules in accordance with exemplary embodiments, but the application 560 is not meant to be a limitation.

The operating system 550 controls the execution of other computer programs, and provides scheduling, input-output control, file and data management, memory management, and communication control and related services. It is contemplated by the inventors that the application 560 for implementing exemplary embodiments may be applicable on all commercially available operating systems.

Application 560 may be a source program, executable program (object code), script, or any other entity comprising a set of instructions to be performed. When a source program, then the program is usually translated via a compiler (such as the compiler 540), assembler, interpreter, or the like, which may or may not be included within the memory 520, so as to operate properly in connection with the O/S 550. Furthermore, the application 560 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 570 may include input devices such as, for example but not limited to, a mouse, keyboard, scanner, microphone, camera, etc. Furthermore, the I/O devices 570 may also include output devices, for example but not limited to a printer, display, etc. Finally, the I/O devices 570 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 570 also include components for communicating over various networks, such as the Internet or intranet.

If the computer 500 is a PC, workstation, intelligent device or the like, the software in the memory 520 may further include a basic input output system (BIOS) (omitted for simplicity). The BIOS is a set of essential software routines that initialize and test hardware at startup, start the O/S 550, and support the transfer of data among the hardware devices. The BIOS is stored in some type of read-only-memory, such as ROM, PROM, EPROM, EEPROM or the like, so that the BIOS can be executed when the computer 500 is activated.

When the computer 500 is in operation, the processor 510 is configured to execute software stored within the memory 520, to communicate data to and from the memory 520, and to generally control operations of the computer 500 pursuant to the software. The application 560 and the O/S 550 are read, in whole or in part, by the processor 510, perhaps buffered within the processor 510, and then executed.

When the application 560 is implemented in software it should be noted that the application 560 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 560 can be embodied in any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any means that can store the program for use by or in connection with the instruction execution system, apparatus, or device. The computer readable storage medium can be, for example but not limited to, an electronic, magnetic, optical, electromagnetic, or semiconductor system, apparatus, or a device.

More specific examples (a nonexhaustive list) of the computer-readable storage medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable storage medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 560 is implemented in hardware, the application 560 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects and benefits include a reduction in failed migration sessions in a computer storage system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A nonexhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for impact-based migration scheduling, the method comprising:
   identifying, by a migration scheduling module, a plurality of feasible destination storage devices for a migration session, the migration session comprising a transfer of a data volume from a source storage device located in a first tier to a destination storage device located in a second tier in a computer storage system;
   determining, for each of the identified destination storage devices, an impact of the migration session during the migration session;
   determining, for each of the identified destination storage devices, an impact of the migration session after the migration session is completed;
   selecting a destination storage device from the identified destination storage devices based on the impact of the migration session during the migration session and the impact of the migration session after the migration session is completed; and
   determining a start time and transfer rate for the migration session based on the selected destination storage device.

2. The method of claim 1, further comprising:
   receiving, by the migration scheduling module, a plurality of recommended migration sessions; and
   sorting the recommended migration sessions to generate a sorted list of migration sessions before identifying the plurality of feasible destination storage devices for the migration session, wherein the sorting is performed based on at least one of criticality of each of the plurality of migration sessions, a data transfer size associated with each of the plurality of migration sessions, and whether a migration session is an uptiering or downtiering migration.

3. The method of claim 2, wherein a migration session comprising an uptiering migration is placed in the sorted list above a migration session comprising a downtiering migration.

4. The method of claim 2, further comprising performing the identifying, determining of the impact during and after the migration session, and selecting for each of the plurality of recommended migration sessions in the sorted list in an order that is based on the sorted list.

5. The method of claim 2, further comprising performing the identifying, determining of the impact during and after the migration session, and selecting for the plurality of recommended migration sessions in the sorted list in an order that is based on the sorted list until a utilization threshold for the computer storage system is reached.

6. The method of claim 1, wherein determining, for each of the identified destination storage devices, the impact of the migration session during the migration session comprises:
   determining a start time and a transfer rate for the migration session that minimizes an input/output metric for the migration session for each of the identified destination storage devices based on historical input/output data for each of the identified destination storage devices.

7. The method of claim 1, further comprising receiving a migration time window for the migration session by the migration scheduling module, wherein the start time is during the migration time window, and wherein the transfer rate is selected such that the migration session will complete in the migration time window.

8. The method of claim 1, wherein the identified destination storage devices comprise a set of storage devices in the second tier of the migration session that are selected such that each of the identified destination storage devices has sufficient free storage space to store the data volume associated with the migration session.

9. A computer program product for implementing impact-based migration scheduling, the computer program product comprising:
   a non-transitory computer readable storage medium having program instructions embodied therewith, the program instructions readable by a processing circuit to cause the processing circuit to perform a method comprising:
   identifying, by a migration scheduling module, a plurality of feasible destination storage devices for a migration session, the migration session comprising a transfer of a data volume from a source storage device located in a first tier to a destination storage device located in a second tier in a computer storage system;
   determining, for each of the identified destination storage devices, an impact of the migration session during the migration session;
   determining, for each of the identified destination storage devices, an impact of the migration session after the migration session is completed;
   selecting a destination storage device from the identified destination storage devices based on the impact of the migration session during the migration session and the impact of the migration session after the migration session is completed; and
   determining a start time and transfer rate for the migration session based on the selected destination storage device.

10. The computer program product of claim 9, further comprising:
    receiving, by the migration scheduling module, a plurality of recommended migration sessions; and
    sorting the recommended migration sessions to generate a sorted list of migration sessions before identifying the plurality of feasible destination storage devices for the migration session, wherein the sorting is performed based on at least one of criticality of each of the plurality of migration sessions, a data transfer size associated with each of the plurality of migration sessions, and whether a migration session is an uptiering or downtiering migration.

11. The computer program product of claim 10, wherein a migration session comprising an uptiering migration is placed in the sorted list above a migration session comprising a downtiering migration.

12. The computer program product of claim 10, further comprising performing the identifying, determining of the impact during and after the migration session, and selecting for each of the plurality of recommended migration sessions in the sorted list in an order that is based on the sorted list.

13. The computer program product of claim 10, further comprising performing the identifying, determining of the impact during and after the migration session, and selecting for the plurality of recommended migration sessions in the sorted list in an order that is based on the sorted list until a utilization threshold for the computer storage system is reached.

14. The computer program product of claim 9, wherein determining, for each of the identified destination storage devices, the impact of the migration session during the migration session comprises:

determining a start time and a transfer rate for the migration session that minimizes an input/output metric for the migration session for each of the identified destination storage devices based on historical input/output data for each of the identified destination storage devices.

15. A computer system for impact-based migration scheduling, the system comprising:

a memory; and a processor, communicatively coupled to said memory, the computer system configured to perform a method comprising:

identifying, by a migration scheduling module, a plurality of feasible destination storage devices for a migration session, the migration session comprising a transfer of a data volume from a source storage device located in a first tier to a destination storage device located in a second tier in a computer storage system;

determining, for each of the identified destination storage devices, an impact of the migration session during the migration session;

determining, for each of the identified destination storage devices, an impact of the migration session after the migration session is completed;

selecting a destination storage device from the identified destination storage devices based on the impact of the migration session during the migration session and the impact of the migration session after the migration session is completed; and     determining a start time and transfer rate for the migration session based on the selected destination storage device.

16. The system of claim 15, further comprising:

receiving, by the migration scheduling module, a plurality of recommended migration sessions; and     sorting the recommended migration sessions to generate a sorted list of migration sessions before identifying the plurality of feasible destination storage devices for the migration session, wherein the sorting is performed based on at least one of criticality of each of the plurality of migration sessions, a data transfer size associated with each of the plurality of migration sessions, and whether a migration session is an uptiering or downtiering migration.

17. The system of claim 16, wherein a migration session comprising an uptiering migration is placed in the sorted list above a migration session comprising a downtiering migration.

18. The system of claim 16, further comprising performing the identifying, determining of the impact during and after the migration session, and selecting for each of the plurality of recommended migration sessions in the sorted list in an order that is based on the sorted list.

19. The system of claim 16, further comprising performing the identifying, determining of the impact during and after the migration session, and selecting for the plurality of recommended migration sessions in the sorted list in an order that is based on the sorted list until a utilization threshold for the computer storage system is reached.

20. The system of claim 15, wherein determining, for each of the identified destination storage devices, the impact of the migration session during the migration session comprises:

determining a start time and a transfer rate for the migration session that minimizes an input/output metric for the migration session for each of the identified destination storage devices based on historical input/output data for each of the identified destination storage devices.

\* \* \* \* \*